United States Patent
Neustadt et al.

(10) Patent No.: US 7,865,145 B2
(45) Date of Patent: Jan. 4, 2011

(54) VSWR MEASUREMENT DEVICE

(75) Inventors: Alf Neustadt, Stuttgart (DE); Keld Lange, Ötisheim (DE)

(73) Assignee: Alcatel-Lucent, Paris (FR)

( * ) Notice: Subject to any disclaimer, the term of this patent is extended or adjusted under 35 U.S.C. 154(b) by 1239 days.

(21) Appl. No.: 11/452,406

(22) Filed: Jun. 14, 2006

(65) Prior Publication Data

US 2007/0010216 A1 Jan. 11, 2007

(30) Foreign Application Priority Data

Jul. 11, 2005 (EP) .................................. 05291497

(51) Int. Cl.
*H04B 17/00* (2006.01)

(52) U.S. Cl. ................. 455/67.11; 455/161.3; 455/423; 455/424

(58) Field of Classification Search ................ 455/63.3, 455/67.11, 161.3, 423, 424
See application file for complete search history.

(56) References Cited

U.S. PATENT DOCUMENTS

| 6,289,216 | B1 | 9/2001 | Koh et al. |
| 6,603,810 | B1 * | 8/2003 | Bednekoff et al. ........... 375/228 |
| 6,625,428 | B1 | 9/2003 | Finnell et al. |
| 6,754,439 | B1 * | 6/2004 | Hensley et al. .............. 386/111 |
| 7,289,483 | B1 * | 10/2007 | Lim ........................... 370/342 |
| 2004/0013094 | A1 * | 1/2004 | Tong et al. .................. 370/320 |
| 2004/0203447 | A1 | 10/2004 | Lee |

FOREIGN PATENT DOCUMENTS

EP 1 051 811 11/2000

* cited by examiner

*Primary Examiner*—Tuan H Nguyen
(74) *Attorney, Agent, or Firm*—Fay Sharpe LLP

(57) ABSTRACT

A voltage standing wave ratio (VSWR) measurement device for orthogonal frequency division multiplexing (OFDM) signal, in particular code division multiple access (CDMA) signals, comprising a radio frequency switch, a unit for converting the signal from the radio frequency (RF) switch into the digital base band, means for extracting a pilot signal out of a multitude of OFDM/CDMA signals, a timing unit and a code generator associated with said extraction means and a controller.

8 Claims, 1 Drawing Sheet

VSWR MEASUREMENT DEVICE

Figure 1:
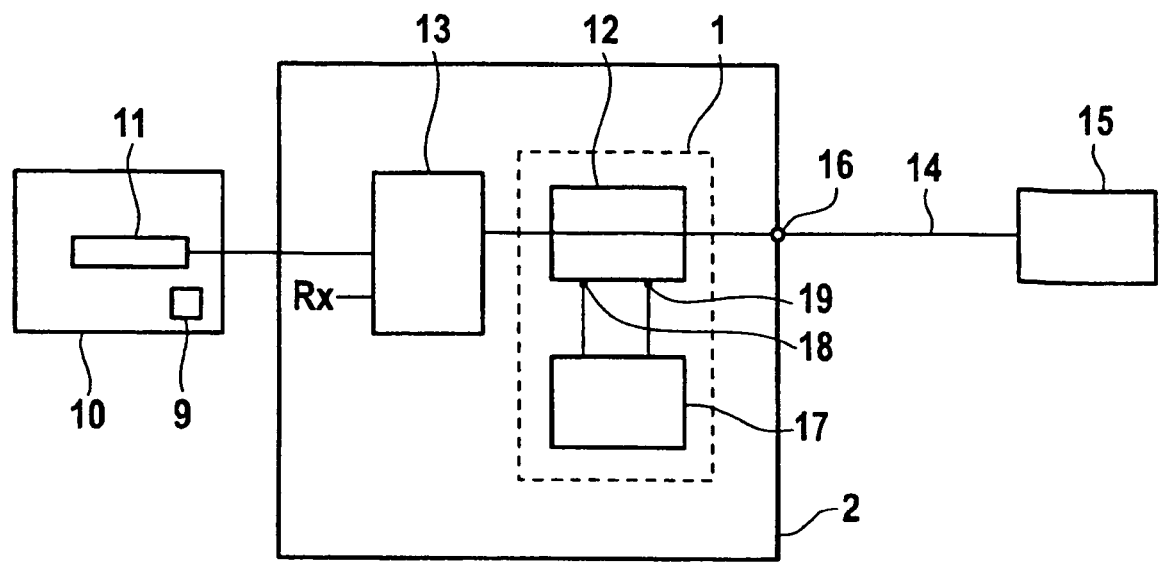

The invention is based on a priority application EP 05291497.5 which is hereby incorporated by reference.

The present invention refers to wireless communication networks using orthogonal frequency division multiplexing (OFDM), and in particular code division multiple access (CDMA). More particularly it refers to a VSWR (voltage standing wave ratio) measurement device for an antenna network, whereby the antenna network may be integrated into base stations for such a communication network using OFDM, and in particular using CDMA.

BACKGROUND AND PRIOR ART

An operator of a wireless communication system such as UMTS (Universal Mobile Telecommunications System) typically has to administer thousands of base stations. Automatic supervision to the largest extent is mandatory to be able to operate the network with a good quality at reasonable cost.

Different methods are used for the supervision of the antennas and their connection cables/feeders. The most important one is the VSWR supervision. With this method, which is basically known to the man skilled in the prior art, the power $P_{fwd}$ of a signal travelling to the antenna, the forward signal, and the power $P_{rev}$ of the same signal travelling back from the antenna, the reverse signal, is measured. The ratio VSWR= $(1+P_{rev}/P_{fwd})/(1-P_{rev}/P_{fwd})$ is monitored, whereby sudden or slow changes exceeding a certain limit indicate a failure somewhere between or at the measurement point and the radiating point.

Performing VSWR measurements for GSM systems is a standard technique. As GSM transmissions through the air are performed in time slots at constant transmission power, it is possible to measure the forward signal to the antenna in a first part of a time slot, and to measure the corresponding reverse signal in a second part of the same time slot.

Using such VSWR measurement devices for CDMA systems, for example UMTS systems, shows unsatisfactory results. A major reason is that the transmission power in the UMTS case is not constant, but depends on the number of user equipments (UE's) to be served. Thus a changing number of user equipments to be served by a base station changes the VSWR ratio and thus distorts a VSWR measurement.

SUMMARY OF THE INVENTION

It is an object of the invention to provide a VSWR measurement device and a corresponding method which is suitable for communication systems using CDMA.

This object and other objects are solved by the features of the independent claims. Further embodiments of the invention are described by the features of the dependent claims. It should be emphasized that any reference signs in the claims shall not be construed as limiting the scope of the invention.

The VSWR measurement device according to the invention comprises a radio frequency (RF) switch and a unit for converting the signal received from the RF switch into the digital base band. The digitized CDMA signal is fed into means for extracting the pilot signal from the CDMA signal. Furthermore, the device includes a timing unit, a code generator associated with said extraction means, and a controller.

a) The method according to the invention serves for measuring the VSWR ratio of a CDMA signal and comprises the following steps:
    converting a forward CDMA signal into the digital base band, b) extracting the pilot signal from the CDMA signal, c) measuring the signal strength of the pilot signal, d) repeating steps a), b) and c) for the corresponding reverse CDMA signal.

The invention is based on the idea that a VSWR measurement for CDMA systems should be carried out by using the pilot signal only, as the pilot signal is transmitted with a constant transmission power. As the forward CDMA signal in a VSWR measurement comprises a multitude of UE signals and the pilot signal, the VSWR measurement device must have means for extracting the pilot signal. This makes sure that the measured power $P_{fwd}$ only stems from the pilot signal. Correspondingly, the same approach is used for the reverse signal, where only the pilot signal, isolated from the UE signals, is used to measure the power $P_{rev}$ of the reverse signal.

The VSWR measurement device thus comprises the above-mentioned extraction means and is suitable for an antenna network which can be part of a base station.

The VSWR measurement device is suitable for CDMA signals and has the advantage to provide VSWR measurement values of high accuracy.

If the VSWR measurement device is integrated into an antenna network being part of a base station, it provides the additional advantage of facilitating the cabling between the transmitters and the antenna networks. More specifically, it helps to make sure that the cabling between these components has been done correctly. Base stations can have a multitude of transmitters connected to a multitude of antenna networks. It is important to guarantee that the cabling is done correctly, namely that the correct input port of an antenna network is connected to the correct transmitter. With the VSWR measurement device it is possible to automatically detect which transmitter is connected to which input/output port of an antenna network. As a consequence, cabling errors are avoided.

Another advantage of the VSWR measurement device is that it allows the measurement of the attenuation of the feeder cable from the antenna network to the antenna or to a TMA (tower mounted amplifier). This can simplify the installation process and make it more reliable.

Still another advantage of the VSWR measurement device is that it allows a measurement with which a reflection point within a feeder cable can be located when the VSWR ratio deteriorates.

These and other aspects of the invention will be apparent from and elucidated with reference to the embodiments described thereafter. It should be noted that the use of reference signs shall not be construed as limiting the scope of the invention.

BRIEF DESCRIPTION OF THE TABLES AND DRAWINGS

Figure 2:
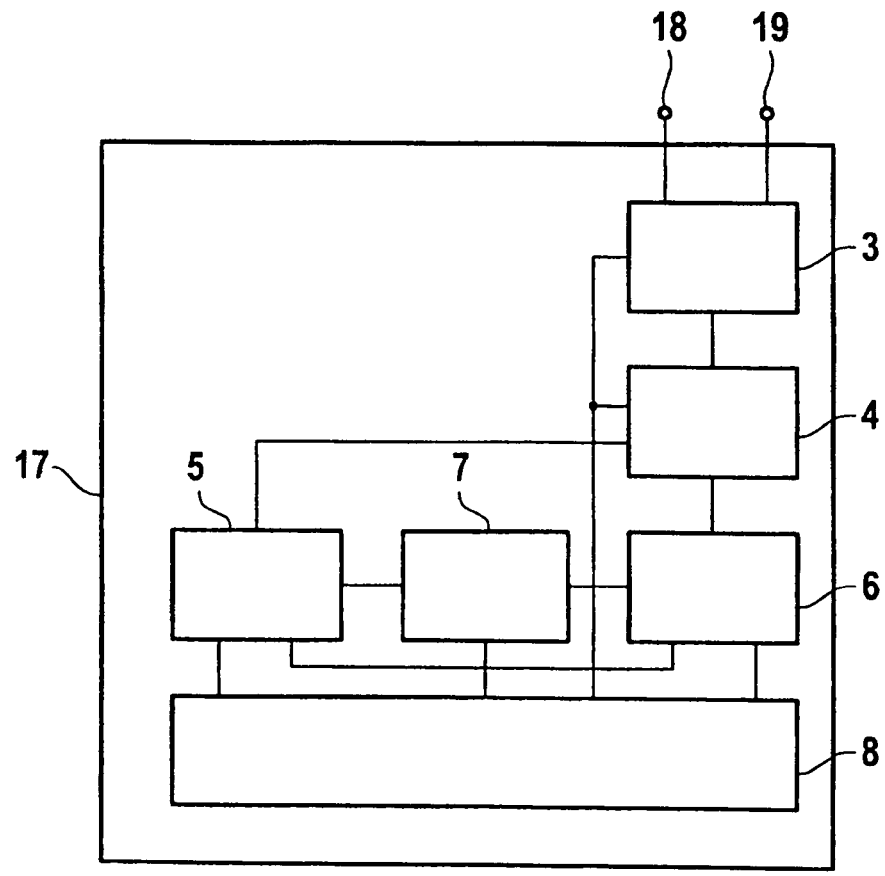

FIG. 1: shows a block diagram of a base station having a VSWR measurement device, FIG. 2: shows a block diagram of the measurement unit which is part of the VSWR measurement device.

DETAILED DESCRIPTION OF THE DRAWINGS AND OF THE PREFERRED EMBODIMENTS

FIG. 1 shows a block diagram of a base station 10 having a VSWR measurement device 1. The base station 10 has a power generation unit (not shown) for the generation of a radio frequency (RF) CDMA signal. This RF signal is coupled into an antenna network 2 via a transmit chain 11.

Antenna network 2 couples the CDMA signal into a duplexer 13 which is connected with the VSWR measurement device 1. The Rx path is not shown for sake of clarity. The input/output port 16 of VSWR antenna network 2 is connected to antenna 15 via a feeder 14.

VSWR measurement device 1 comprises a conventional directional coupler 12 and a measurement unit 17. The directional coupler 12 has the purpose to provide an input signal for the measurement unit 17. It outputs a forward signal at port 18 and a reverse signal at port 19.

The input signal for the measurement unit 17 is comprised of a multitude of UE signals, the number of which may change within a VSWR measurement. It further comprises a pilot signal transmitted with a constant transmission power which is communicated to the user equipments.

The measurement unit 17 extracts the pilot signal from the input signal and uses it to determine the forward power and the reverse power as will be explained below in more detail.

FIG. 2 shows a block diagram of the measurement unit 17 in more detail. It has two input ports 18 and 19 which are connected to a RF switch 3. The input ports 18 and 19 are connected to the directional coupler 12 as shown in FIG. 1.

The RF switch 3 allows the input of either a forward signal or of a reverse signal for measurement purposes. In a first cycle only the forward signal is inputted to measure the forward power $P_{fwd}$ of the pilot signal. Then the RF switch is used such that only the reverse signal is inputted to measure the reverse power $P_{rev}$ of the pilot signal. The timing of the RF switch 3 is controlled by a controller 8.

The output of the RF switch 3 is converted into the digital baseband I and Q signals by a converter 4. The converter 4 has a bandwidth of one WCDMA carrier whereby the carrier frequency is selected by controller 8. Sampling is performed at one or two times the WCDMA chip rate.

The converter 4 could consist of a local oscillator realized with a PLL and a VCO (voltage controlled oscillator), a variable gain amplifier, a I/Q converter, 2 A/D converters, and 2 FIR filters.

The converted signal is fed into extraction means 6, which might in the case of an OFDM signal be a FFT demodulator. In CDMA systems for enabling UMTS services a correlator or a demodulator. can be used. The extraction means 6 isolates the pilot signal from the UE signals. For doing that the converter 4 not only receives the converted signal, but also either a SCH code or a CPICH code from a code generator 7. The extraction means 6 matches the converted signal with the generated code. If the code matches to the signal the output of the extraction means 6 is the forward power or reverse power of the pilot signal.

A clock and timing unit 5 is connected to the code generator 7 and generates the necessary timing signals needed to generate codes with the appropriate timing. Furthermore, the clock and timing unit 5 is connected to the converter 4 for a proper synchronisation and timing of the conversion process.

The clock/timing unit 5 can use a stable reference clock close to the chip clock but not locked to the Tx clock. In this case a retiming is necessary from time to time. In the alternative a clock is used which is locked to the chip clock. In the latter case only an initial synchronisation is necessary.

For time synchronization the SCH code is preferably used. Locking the clock to the chip clock can be achieved by using some NodeB reference clock or by using the SCH code to recover the transmit clock. This is indicated by a dashed line between clock 9 and the measurement unit 17 in FIG. 1. The most efficient implementation is to share the clock signal between the transmit chain 11 and the VSWR measurement device 1.

An implementation of the clock and timing unit 5 could be realized with a PLL using a VCXO (voltage controlled crystal oscillator) and a FPGA. In this case the FPGA could also contain the code generator 7 and the extraction means 6.

The output of the extraction means 6 is fed into controller 8. The controller 8 calculates the power ($P_{fwd}$ or $P_{rev}$) outputted by the extraction means 6 and carries out a filtering. Furthermore, the controller may, if desired, perform a processing of the output. As an example, it may coherently add several symbols in order to improve the signal-to-noise-ratio.

An advantage of the VSWR measurement device 1 is that it only measures the forward signal and the reverse signal, and that contributions from signals originating at other sources are efficiently suppressed. The reason is that the extraction means only extracts the pilot signal by means of the CPICH code. External signals do not match to a CPICH code and can't contribute to the measurement value. The VSWR measurement device 1 thus operates with highest accuracy.

The VSWR measurement unit 1 is used in the following way:

In a first step the gain of the converter 4 is adapted to get a satisfactory signal level from the digital I and Q signals.

In a second step a forward signal has to be found. This is done on the SCH (synchronization channel): the timing of the signals from the code generator 7 to the RF switch 3 is swept slowly over the expected time window. The largest signal with an acceptable signal-to-interference-ratio is taken as time reference.

In a third step the pilot signal is searched by the extraction means 6. For that purpose the time and code detection is done according to the conventional UMTS mobile station behavior by searching for code groups being contained in the SCH. This procedure is known to the man skilled in the art, and is specified in 3GPP document 3GPP TS 25.214 sections 4.1 and 4.2.

A simplified time and CPICH code detection is possible if the CPICH code, or the list of possible CPICH codes, is known to the controller. In this case the controller is adapted to try each code to find a signal. The result is the CPICH code of the reverse signal or the forward signal. In addition, it is also detected whether the signal is a primary or secondary transmit signal in case of transmit diversity.

If the transmit chain 11 and the VSWR measurement device 1 share the same clock 9 the CPICH code detection can be done in a brute force way. In order to reduce the search effort, a list of possible CPICH codes should be provided to the controller 8.

With the detected CPICH code the pilot signal of the forward CDMA signal can be extracted. The output of the extraction means yields the power $P_{fwd}$ of this signal.

In the next step the RF switch 3 is switched into the reverse direction, such that the RF switch 3 allows the input of the reverse signal only. As the CPICH code is the same for the forward signal and the reverse signal, time and CPICH code detection needn't be done for the reverse signal. With the detected CPICH code, the reverse path is swept slowly and the reverse power $P_{rev}$ is measured in the same fashion. The reverse power is the sum over the whole sweep. Thus $P_{fwd}$ and $P_{rev}$ are alternatively measured and VSWR is calculated as described in the introductory part of this disclosure.

If the VSWR measurement device is integrated into an antenna network being part of a base station, it provides the opportunity to automatically detect which transmitter is connected to which input/output port of an antenna network. This opportunity exists because the CPICH code is different for each antenna. The forward power measured by the VSWR measurement device, obtained by help of a certain CPICH code, belongs to a transmitter associated with this CPICH code. The measured values are transferred to a central unit in the base station to check proper configuration.

As mentioned above, the VSWR measurement device allows the measurement of the attenuation of the feeder cable from the antenna network to the antenna or to a TMA (tower mounted amplifier). For that purpose a (forward) CDMA signal is send to the TMA, and the corresponding reverse signal is detected. The forward power $P_{fwd}$ and the reverse power $P_{rev}$ of the pilot signal are measured as described above. Now two possibilities exist:

If the feeder cable if detached from the TMA, half of the return loss ($P_{fwd}-P_{rev}$) can be assumed as one way cable loss. A confirmation can be obtained by making a shortcut on the detached cable end.

If the cable is attached to the TMA, the TMA can usually be found with the reverse profiling highlighting the difference between two profiles: one with TMA powered, one with TMA unpowered—the TMA matching differs in both cases. The attenuation can be calculated if the cable characteristics are known using the propagation delay of the cable to calculate the length and using the cable attenuation per m together with the calculated length.

As mentioned above the VSWR measurement device also allows a measurement where a reflection point is located within a feeder cable when the VSWR ratio deteriorates.

Localization of the fault in case of significant VSWR is done with the profiling function. Either the whole profile is presented to the user or only the most significant peak is indicated. If the cable characteristics are know, the time values can be converted to distances.

LIST OF REFERENCE NUMERALS

01 VSWR measurement device
02 antenna network
03 radio frequency (RF) switch
04 converter
05 clock and timing unit
06 extraction means
07 code generator
08 controller
09 clock
10 base station
11 transmit chain
12 directional coupler
13 duplexer
14 feeder
15 antenna
16 input/output port
17 measurement unit
18 forward signal
19 reverse signal

The invention claimed is:

1. A VSWR measurement device for an OFDM signal, in particular a CDMA signal, comprising:
   a) a radio frequency switch,
   b) a unit for converting a CDMA signal from an RF switch into the digital base band,
   c) means for extracting a pilot signal from the CDMA signal found on a synchronization channel (SCH) and for outputting a forward power and a reverse power of the pilot signal, wherein said means for extracting employs an SCH code or a common pilot channel (CPICH) code, and wherein said SCH code or said CPICH code relate to said CDMA signal,
   d) a clock/timing unit and a code generator associated with said extraction means, wherein said code generator provides said SCH code or said CPICH code, wherein said clock/timing unit provides timing signals for said code generator needed to generate the SCH code or the CPICH code with the appropriate timing,
   e) a controller, and
   f) means for measuring the signal strength of the pilot signal.

2. The VSWR measurement device according to claim 1, wherein the extraction means is a correlator or a demodulator.

3. The VSWR measurement device according to claim 1, wherein the code generator generates SCH codes or CPICH codes according to the UMTS standard.

4. The VSWR measurement device according to claim 1, wherein the timing unit generates timing signals for the code generator.

5. The VSWR measurement device according to claim 1, wherein the timing unit comprises a PLL using a VCXO and a FPGA.

6. An antenna network, comprising a VSWR measurement device for an OFDM signal, the VSWR measurement device comprising: a) a radio frequency switch, b) a unit for converting a CDMA signal from an RF switch into the digital base band, c) means for extracting a pilot signal from the CDMA signal found on a synchronization channel (SCH) and for outputting a forward power and a reverse power of the pilot signal, wherein said means for extracting employs an SCH code or a common pilot channel (CPICH) code, and wherein said SCH code or said CPICH code relate to said CDMA signal, d) a clock/timing unit and a code generator associated with said extraction means, wherein said code generator provides said SCH code or said CPICH code, wherein said clock/timing unit provides timing signals for said code generator needed to generate the SCH code or the CPICH code with the appropriate timing, e) a controller, and f) means for measuring the signal strength of the pilot signal.

7. A base station, comprising a VSWR measurement device for an OFDM signal, the VSWR measurement device comprising:
   a) a radio frequency switch,
   b) a unit for converting a CDMA signal from an RF switch into the digital base band,
   c) means for extracting a pilot signal from the CDMA signal found on a synchronization channel (SCH) and for outputting a forward power and a reverse power of the pilot signal, wherein said means for extracting employs an SCH code or a common pilot channel (CPICH) code, and wherein said SCH code or said CPICH code relate to said CDMA signal,
   d) a clock/timing unit and a code generator associated with said extraction means, wherein said code generator provides said SCH code or said CPICH code, wherein said clock/timing unit provides timing signals for said code generator needed to generate the SCH code or the CPICH code with the appropriate timing,
   e) a controller, and
   f) means for measuring the signal strength of the pilot signal.

8. The base station according to claim 7, further comprising a clock with signals transferable to a transmit chain and to the timing unit.

* * * * *